United States Patent
Yoon et al.

(10) Patent No.: US 9,630,512 B2
(45) Date of Patent: Apr. 25, 2017

(54) SYSTEM AND METHOD FOR CONTROLLING ENERGY UNDER INTERLOCK OF ECO-FRIENDLY VEHICLE

(71) Applicant: Hyundai Motor Company, Seoul (KR)

(72) Inventors: Ju Man Yoon, Seoul (KR); Jong Kyong Lim, Gyeonggi-do (KR); Young Kook Lee, Seoul (KR); Heon Young Kwak, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 794 days.

(21) Appl. No.: 14/062,237

(22) Filed: Oct. 24, 2013

(65) Prior Publication Data
US 2015/0021984 A1    Jan. 22, 2015

(30) Foreign Application Priority Data
Jul. 16, 2013  (KR) .................. 10-2013-0083609

(51) Int. Cl.
*B60L 11/18*  (2006.01)
*B60L 3/00*   (2006.01)
*B60L 3/04*   (2006.01)

(52) U.S. Cl.
CPC ......... *B60L 11/1803* (2013.01); *B60L 3/0046* (2013.01); *B60L 3/04* (2013.01); *Y02T 10/7005* (2013.01)

(58) Field of Classification Search
None
See application file for complete search history.

(56) References Cited

U.S. PATENT DOCUMENTS

| | | | |
|---|---|---|---|
| 5,369,540 A * | 11/1994 | Konrad | B60L 11/1803 361/3 |
| 7,268,521 B1 * | 9/2007 | Prakash | B60L 7/14 320/166 |
| 2013/0076405 A1 * | 3/2013 | Ransom | H02M 1/08 327/109 |

FOREIGN PATENT DOCUMENTS

| | | | |
|---|---|---|---|
| DE | 102004057693 A1 * | 6/2006 | H02J 7/3545 |
| JP | 200-341801 | 12/2000 | |
| JP | 2013-098170 A | 5/2013 | |
| KR | 10-0802679 | 2/2008 | |
| KR | 10-2010-0004013 A | 1/2010 | |
| KR | 10-2012-0073405 | 7/2012 | |
| KR | 10-2013-0013481 | 2/2013 | |
| KR | 10-1241226 B1 | 3/2013 | |
| KR | 10-2013-0053037 A | 5/2013 | |

* cited by examiner

*Primary Examiner* — Jared Fureman
*Assistant Examiner* — Joel Barnett
(74) *Attorney, Agent, or Firm* — Mintz Levin Cohn Ferris Glovsky and Popeo, P.C.; Peter F. Corless

(57) ABSTRACT

A system and method for controlling energy of an eco-friendly vehicle are provided and include turning off, by a controller, a main relay in response to sensing interlock by means of a detection circuit and charging a secondary batter by discharging voltage of a capacitor in an inverter to the secondary battery, under control of voltage output from a low voltage DC converter after the main relay is turned off. In addition, the controller is configured to discharge DC-link voltage to a driving motor by operating the inverter after charging the second battery.

9 Claims, 4 Drawing Sheets

SYSTEM AND METHOD FOR CONTROLLING ENERGY UNDER INTERLOCK OF ECO-FRIENDLY VEHICLE

CROSS-REFERENCE TO RELATED APPLICATION

This application claims under 35 U.S.C. §119(a) the benefit of Korean Patent Application No. 10-2013-0083609 filed Jul. 16, 2013, the entire contents of which are incorporated herein by reference.

BACKGROUND (a) Technical Field

The present disclosure relates to a system and method for controlling energy in a vehicle. More particularly, the present disclosure relates to a system and method for controlling energy of an eco-friendly vehicle that effectively discharges the voltage at an inverter DC link terminal, restores energy consumed due to high-voltage discharge, and efficiently uses energy of a vehicle.

(b) Background Art

Currently, common internal combustion engine vehicles that use fossil fuels such as gasoline or diesel cause environmental contamination due to exhaust gas, global warming due to carbon dioxide emissions, and induction of respiratory disease due to generation of ozone. Eco-friendly vehicles such as an Electric Vehicle (EV) that runs by operating an electric motor, a Hybrid Electric vehicle (HEV) that runs using an engine and an electric motor, and a Fuel Cell Electric Vehicle (FCEV) that runs by operating an electric motor, that use power generated by a fuel cell have been developed.

The eco-friendly vehicles are low emission vehicles, that minimize the environmental problem and the problem of exhaustion of natural resource, or zero emission vehicles. As shown in FIG. 1, these vehicles include an electric motor (e.g., driving motor) 30 for driving the vehicles and a high-voltage battery (e.g., main battery) 10 that is an electricity accumulation unit that supplies power to the electric motor 30, and further include an inverter 21 that operates the electric motor 30.

In the FCEV, an electricity accumulation unit such as a battery is used as a secondary power source in parallel with a fuel cell, which is the main power source, and fuel cell hybrid systems including a supercapacitor as a secondary power source other than a battery have also been developed.

The inverter 21, which drives an electric motor (hereafter, referred to as 'driving Motor') 30 by changing the phase of power supplied from a high-voltage battery 10 (or fuel cell), converts direct current (DC) voltage of a high-voltage battery into three-phase alternating current (AC) power and then supplies the power as the driving power for the driving motor.

In FIG. 1, the reference numeral '20' indicates a Motor Control Unit (MCU) that drives phase conversion by switching devices S in the inverter 21 in Pulse Width Modulation (PWM). Further, the eco-friendly vehicles are mounted with a power conversion system, for example, with the high-voltage battery 10, and a Low Voltage DC-DC Converter (LDC) 40 for DC-DC power conversion between a low-voltage battery (e.g., 12V secondary battery) 50 and a low-voltage auxiliary electric load.

Accordingly, the eco-friendly vehicles such as HEVs and EVs use two batteries of the high-voltage battery 10 used as a high-voltage main power source and a 12V auxiliary battery for common vehicles used as a 12V power source, in which the high-voltage battery 10 supplies power to a driving system (e.g., driving motor), an air conditioner, or a heater and the 12V auxiliary battery 50 supplies power to the low-voltage electric loads in the vehicles, similar to the system in common vehicles. When the power of the auxiliary battery 50 is insufficient, the auxiliary battery is charged by the LDC 40.

On the other hand, during a collision of a vehicle, an electric shock accident may occur due to electric connection between a high-voltage battery and a driver, and therefore a technology of a forced high voltage discharge has been used in the related art to remove the danger of the high-voltage shock.

FIG. 2 is an exemplary flowchart illustrating a forcible discharge logic of the related art. Referring to FIG. 2, when a key-off or an airbag operation signal (e.g., collision signal) is sensed, a controller (e.g., HPCU) fixes interlock situation (S1) and transmits a signal requesting main relay off to a battery controller (hereafter, referred to as a battery management system 'BMS'). The battery controller turns off a main relay 11 within a predetermined time and transmits the off-state of the main relay 11 to power conversion controllers (MCU, etc.) (S2).

The voltage of a DC capacitor C is forcibly discharged from the point of time (S3), in which the motor control unit (hereafter, referred to as an 'MCU') 20 performs forcible discharge that the capacitor voltage is discharged to the driving motor 30 by switching control of a switching device S in the inverter 21.

Furthermore, the d-axis current, not the q-axis current, is applied as much as possible to the driving motor 30 (zero torque control of a motor). However, the type of forcible discharge of the related art consumes energy stored in the capacitor C of the inverter 21 without restoring energy.

On the other hand, in the eco-friendly vehicles, the battery power is supplied to power conversion systems (e.g., inverter, LDC, etc.) such as the inverter 21 and the LDC 40 via a DC junction box 60 and various relays and fuses, including a PRA (Power Relay Assembly) such as the main relay 11 controlled to be on/off by a BMS (Battery Management System), are disposed within the junction box 60 (e.g., the main relay is separated from the junction box in FIG. 1). However, since the power conversion systems and the DC junction box share the high-voltage power source via a connector, when the connector that is connected to the junction box is mistakenly separated while the engine is operating, an electric shock accident may occur due to electric connection between the high-voltage battery power and the human body.

When forcible discharge through the inverter is performed in removal of the connector to take precautions against the danger, the energy stored in the capacitor C is consumed without being restored. Further, torque may be generated in the driving motor 30 due to an angular error of a rotation sensor in the forcible separation through the inverter 21, and thus, when the driver separates the connector to examine the vehicle, there is the possibility that the vehicle may start and injury.

The above information disclosed in this section is only for enhancement of understanding of the background of the invention and therefore it may contain information that does not form the prior art that is already known in this country to a person of ordinary skill in the art.

SUMMARY

In one aspect, the present invention provides a method for controlling energy under interlock of an eco-friendly vehicle, which may include: turning off, by a controller, a main relay in response to sensing interlock by a detection circuit; charging, by the controller, a secondary batter by discharging voltage of a capacitor in an inverter to the secondary battery, under control of voltage output from a low voltage DC converter after the main relay is turned off; and discharging, by the controller, DC-link voltage to a driving motor by operating the inverter after charging the second battery.

In an exemplary embodiment, when DC-link voltage Vdc detected by a voltage detector is higher than predetermined voltage after the main relay is turned off, the secondary battery may be charged by discharging the voltage of the capacitor in the inverter, and when the DC-link voltage decreases to the predetermined voltage or less, the DC-link voltage may be discharged by applying the DC-link voltage to the driving motor.

In another exemplary embodiment, the discharging of DC-link voltage by applying the DC-link voltage to the driving motor may perform zero (e.g., minimal) torque control that applies d-axis current to the driving motor by performing switching on a switching device in the inverter. In addition, the interlock is the state in which a connector connected to a junction box is separated.

According to the energy control method of the present invention, it may be possible to discharge the voltage of a capacitor in an inverter within a decreased time period and to return the power, which is consumed by forcible discharge in the related art, to a secondary battery, to use the energy of a vehicle more efficiently and that it may be implemented without adding any hardware. Further, it may be possible to preclude the problem that may cause torque when separating a connector due to a problem in a rotation sensor of a driving motor and it may be possible to minimize the possibility a vehicle starting and causing an accident. In addition, it may be possible to restore remaining power of another controller through LDC, even when the controller in a DC junction box fails.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
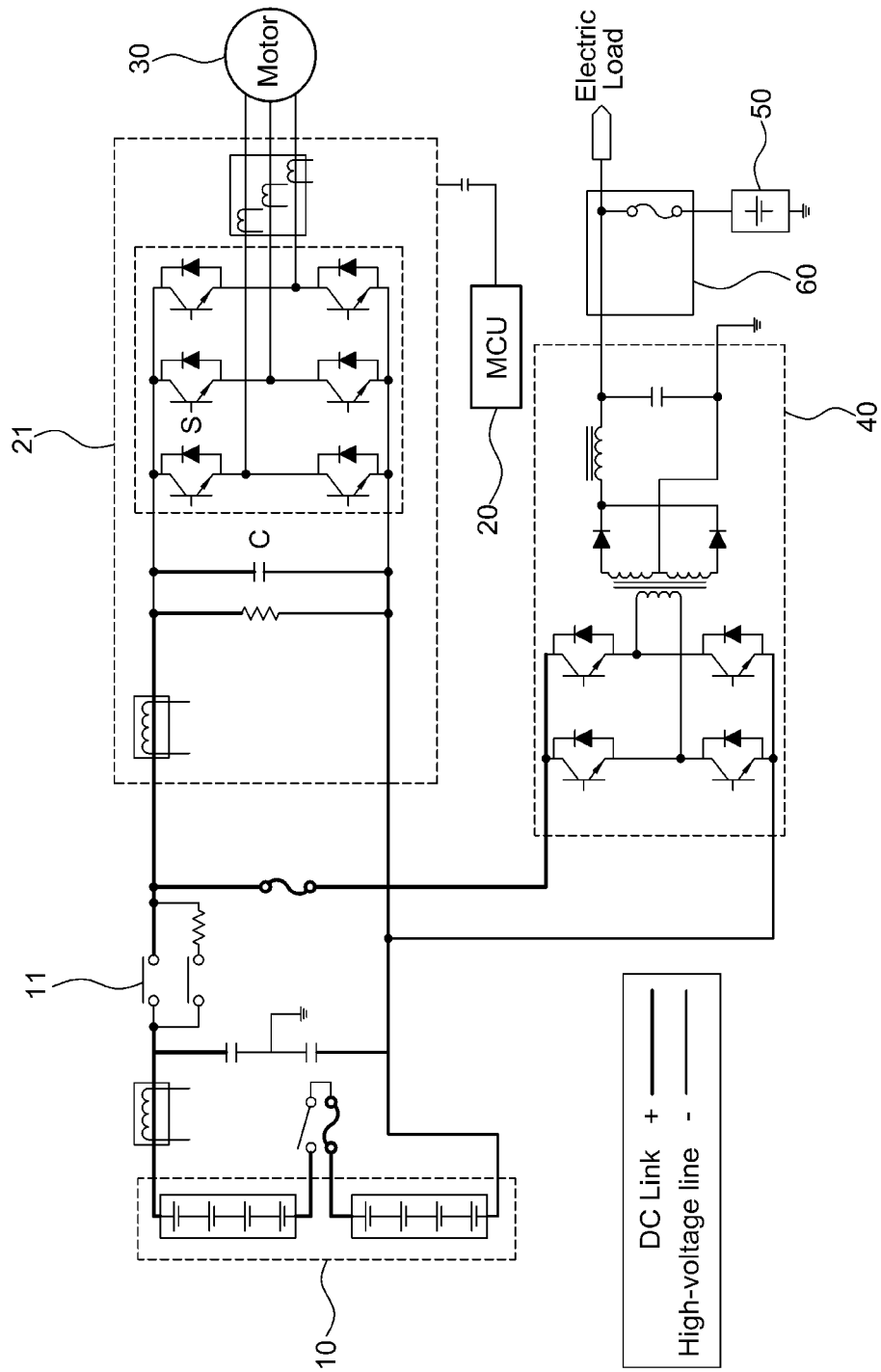
FIG. 1 is an exemplary system circuit diagram illustrating electric power distribution and inverter DC-link voltage discharge of an eco-friendly vehicle of the related art.
Figure 2:
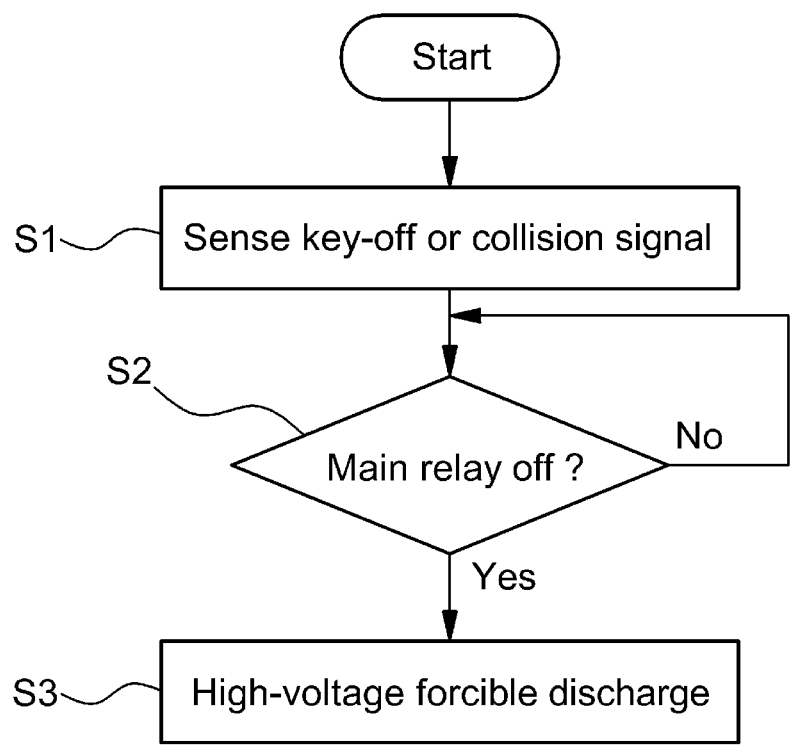
FIG. 2 is an exemplary flowchart illustrating a forcible discharge logic of the related art.

Reference numerals set forth in the Drawings includes reference to the following elements as further discussed below:

| | |
|---|---|
| 10: high-voltage battery | 11: main relay |
| 20: MCU | 21: inverter |
| 30: driving motor | 40: low voltage DC-DC converter (LDC) |
| 50: secondary battery | 60: junction box |

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g., fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described more fully with reference to the accompanying drawings for those skilled in the art to easily implement the present invention.

The present invention provides a system and method for controlling energy of an eco-friendly vehicle which may effectively and forcibly discharge the voltage at an inverter DC link terminal, restore energy consumed due to high-voltage discharge, and efficiently use energy of a vehicle, under interlock due to separation of a connector connected to a high-voltage junction box.

Figure 3:
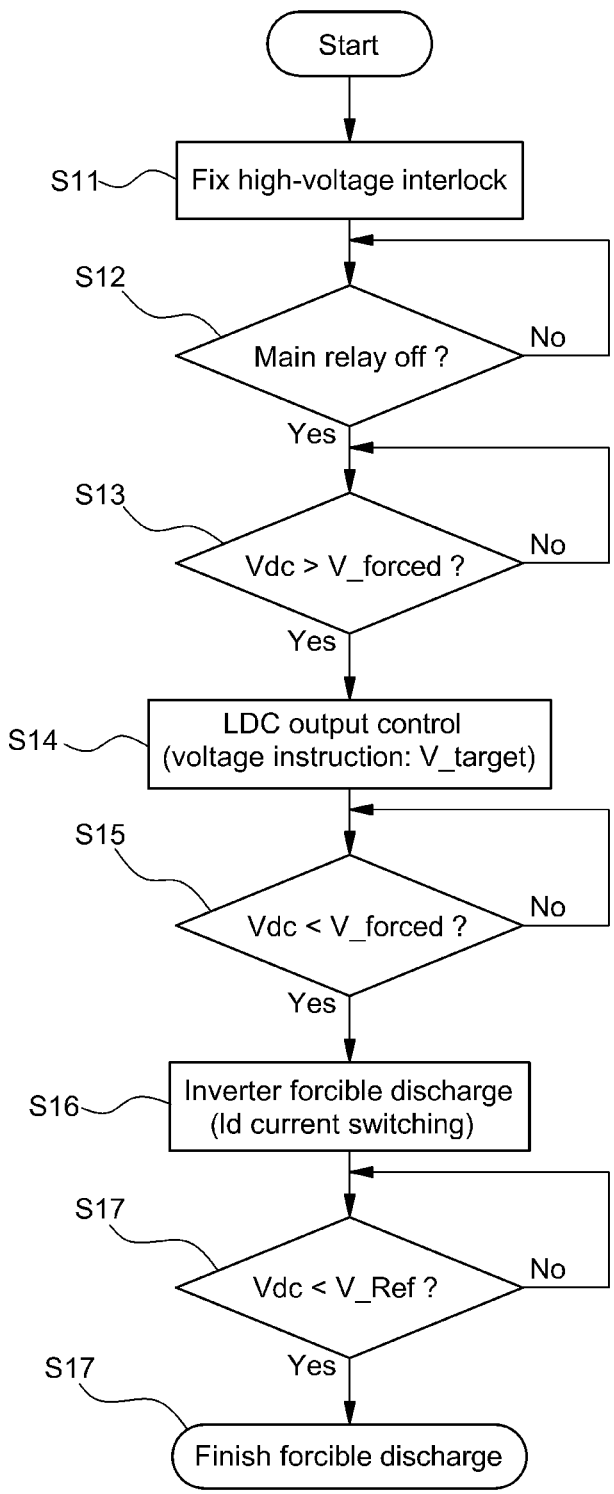
FIG. 3 is an exemplary flowchart illustrating a method for controlling energy under interlock, according to an exemplary embodiment of the present invention.

FIG. 3 is an exemplary flowchart illustrating a method for controlling energy under interlock, according to an exemplary embodiment of the present invention and the control method of the present invention is described hereafter with reference to the figure.

In the control method of the present invention, the subject of control in each step may be a plurality of controllers that performs communication or cooperation control via a vehicle network such as CAN communication or one controller including a plurality of microprocessors having individual functions. For example, the control process of the present invention may be performed under cooperation control of an HCU (Hybrid Control Unit), an MCU, a BMS, and an LDC controller or the control process of the present invention may be performed under cooperation control of an HPCU (Hybrid Power Control Unit) that is an integrated controller including a microprocessor having the HCU function and a microprocessor having the MCU function, a BMS, and an LDC controller. In the following description of the control method according to an exemplary embodiment of the present invention, a controller that is used in common eco-friendly vehicles such as a hybrid vehicle and an electric vehicle is exemplified, but the present invention is not limited thereto.

The controller, using a detection circuit, may be configured to sense an HPCU interlock due to separation of a connector, when the connector connected to a high-voltage junction box is separated, fix the interlock (S11) and immediately transmit a main relay off request signal to a BMS.

Figure 4:
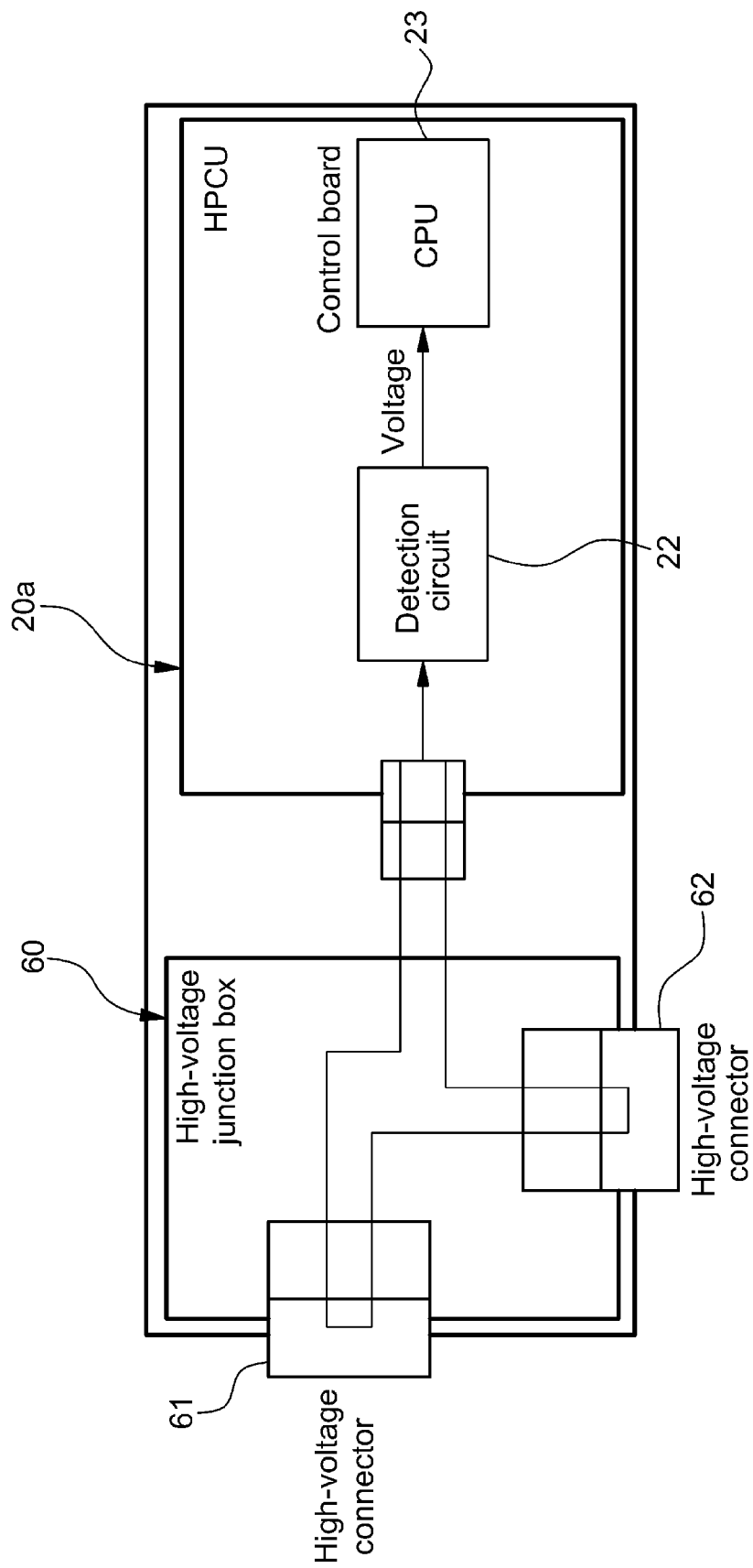
FIG. 4 is an exemplary diagram showing a configuration for detecting connector separation and interlock, according to an exemplary embodiment of the present invention.

FIG. 4 is an exemplary diagram showing a configuration for detecting connector separation and interlock using a detection circuit 22 in the HPCU 20a, in which the high-voltage connector 61 connected to a high-voltage junction box 60, at the left side, may be a connector configured to receive DC high voltage from a high-voltage battery (not shown). Another connector connected to the high-voltage junction box 60, that is, the high-voltage connector 62 at the lower left side in the figure may be a connector configured to distribute high voltage from the high-voltage battery to loads in the vehicle such as another controller.

In this example, when any one of the high-voltage connectors connected to the high-voltage junction box 60 is separated, a CPU (23) on a control board of the HPCU 20a may be configured to sense the separation of the connector from a voltage input value checked by the detection circuit 22, and may be configured to sense and fix interlock due to the separation of the connector. In addition, when the HPCU fixes the interlock and transmits a main relay off request signal to the BMS, the BMS may be configured to turn off the main relay within predetermined time and transmit the off-state of the main relay to the HPCU. When the HPCU confirms that the main relay is turned off (S12), the HPCU may be configured to perform a control process of forcibly discharging DC voltage (e.g., energy) in a capacitor in an inverter from the point of time (S13~S16).

Although energy was consumed by applying DC voltage, which may not cause torque to forcibly discharge the voltage in a capacitor, to a driving motor from this point of time in the related art, the output of an LDC may be controlled to restore some of energy that has been consumed, to a secondary battery in the present invention. In other words, as a result of comparing DC-link voltage Vdc detected by a voltage detector with a predetermined voltage V_forced (S13), when the DC-link voltage is higher than the predetermined voltage, an LDC output voltage instruction V_target may be produced and may be transmitted to an LDC controller.

Therefore, voltage output of the LDC may be controlled based on the voltage instruction (S14), to charge the secondary battery by discharging the DC voltage in the capacitor of the inverter to the secondary battery via the LDC (e.g., the capacitor energy is converted via the LDC and returned to the secondary battery).

When the DC-link voltage Vdc decreases to the predetermined voltage V_forced or less, forcible discharge through the inverter may be performed (S15 and S16), in which the HPCU may be configured to perform forcible discharge that discharges the DC-link voltage to the driving motor by switching the switching device in the inverter. In addition, DC voltage that may not cause torque may be applied to the driving motor, and when the DC-link voltage is the predetermined voltage or less, the DC-link voltage may be decreased to reference voltage V_Ref with a decreased risk of electric shock of a human body by performing forcible discharge that applies the d-axis current, not the q-axis current, to the driving motor. When the DC-link voltage becomes the reference voltage V_Ref by the forcible discharge, the forcible discharge may be completed (S17 and S18).

As described above, the present invention is characterized by discharging the voltage of a capacitor in an inverter to a driving motor at low voltage after discharging, by applying the voltage of the capacitor to a secondary battery through an LDC, through LDC output control under interlock. According to the present invention, it may be possible to discharge the voltage of a capacitor in an inverter within a short time period and return the power, which is consumed by forcible discharge in the related art, to a secondary battery, to use the energy of a vehicle more efficiently and it may be implemented without any additional hardware. Additionally, it may be possible to preclude the problem that may causes torque when separating a connector due to a problem in a rotation sensor of a driving motor and it may be possible to minimize the possibility of a vehicle starting that causes injury. Further, it may be possible to restore remaining power of another controller through LDC, even when the controller in a DC junction box fails.

Although exemplary embodiments of the present invention were described in detail above, the scope of the present invention is not limited to the embodiments and various changes and modifications from the spirit of the present invention defined in the following claims by those skilled in the art are also included in the scope of the present invention.

What is claimed is:

1. A method for controlling energy under interlock of a vehicle, the method comprising:

turning off, by a controller, a main relay when sensing interlock by a detection circuit, wherein the interlock occurs when a connector connected to a junction box is separated from the junction box while an engine is operating and the junction box and a power conversion system share a high-voltage power source via the connector;

charging, by the controller, a secondary battery by discharging voltage of a capacitor in an inverter to the secondary battery, under control of voltage output from a low voltage direct current (DC) converter after the main relay is turned off; and discharging, by the controller, DC-link voltage to a driving motor by operating the inverter after charging the secondary battery.

2. The method of claim 1, wherein further comprising:

when the DC-link voltage detected by a voltage detector is higher than predetermined voltage after the main relay is turned off, charging, by the controller, the secondary battery by discharging the voltage of the capacitor in the inverter; and when the DC-link voltage decreases to the predetermined voltage or less, discharging, by the controller, the DC-link voltage by applying the DC-link voltage to the driving motor.

3. The method of claim 2, wherein the discharging of DC-link voltage by applying the DC-link voltage to the driving motor performs zero torque control that applies d-axis current to the driving motor by switching a switching device in the inverter.

4. A system for controlling energy under interlock of a vehicle, the system comprising:

a junction box;

a connector connected to the junction box; and a controller includes a memory and a processor, the memory configured to store program instructions and the processor configured to execute the program instructions, the program instructions when executed configured to:

turn off a main relay when sensing interlock by a detection circuit, wherein the interlock occurs when the connector is separated from the junction box while an engine is operating and the junction box and a power conversion system share a high-voltage power source via the connector;

charge a secondary battery by discharging voltage of a capacitor in an inverter to the secondary battery, under control of voltage output from a low voltage direct current (DC) converter after the main relay is turned off; and discharge DC-link voltage to a driving motor by operating the inverter after charging the secondary battery.

5. The system of claim 4, wherein the program instructions when executed are further configured to:

charge the secondary battery by discharging the voltage of the capacitor in the inverter when the DC-link voltage detected by a voltage detector is higher than predetermined voltage after the main relay is turned off; and discharge the DC-link voltage by applying the DC-link voltage to the driving motor when the DC-link voltage decreases to the predetermined voltage or less.

6. The system of claim 5, wherein the discharging of DC-link voltage by applying the DC-link voltage to the driving motor performs zero torque control that applies d-axis current to the driving motor by switching a switching device in the inverter.

7. A non-transitory computer readable medium containing program instructions executed by a controller, the computer readable medium comprising:

program instructions that turn off a main relay when sensing interlock by a detection circuit, wherein the interlock occurs when a connector connected to a junction box is separated from the junction box while an engine is operating and the junction box ad a power conversion system share a high-voltage power source via the connector;

program instructions that charge a secondary battery by discharging voltage of a capacitor in an inverter to the secondary battery, under control of voltage output from a low voltage direct current (DC) converter after the main relay is turned off; and program instructions that discharge DC-link voltage to a driving motor by operating the inverter after charging the secondary battery.

8. The non-transitory computer readable medium of claim 7, further comprising:

program instructions that charge the secondary battery by discharging the voltage of the capacitor in the inverter when the DC-link voltage detected by a voltage detector is higher than predetermined voltage after the main relay is turned off; and program instructions that discharge the DC-link voltage by applying the DC-link voltage to the driving motor when the DC-link voltage decreases to the predetermined voltage or less.

9. The non-transitory computer readable medium of claim 8, wherein the discharging of DC-link voltage by applying the DC-link voltage to the driving motor performs zero torque control that applies d-axis current to the driving motor by switching a switching device in the inverter.

* * * * *